United States Patent [19]

Lindenthal et al.

[11] 4,300,361

[45] Nov. 17, 1981

[54] ARTICULATED COUPLING

[75] Inventors: Hans Lindenthal, Heidenheim-Mergelstetten; Waldemar Armasow, Heidenheim; Reinhard Bretzger, Gerstetten, all of Fed. Rep. of Germany

[73] Assignee: Voith Transmit GmbH, Fed. Rep. of Germany

[21] Appl. No.: 45,382

[22] Filed: Jun. 4, 1979

[30] Foreign Application Priority Data

Jun. 10, 1978 [DE] Fed. Rep. of Germany ....... 2825556
Jan. 20, 1979 [DE] Fed. Rep. of Germany ....... 2902226

[51] Int. Cl.³ .............................................. F16D 3/76
[52] U.S. Cl. .................................... 64/17 R; 403/13; 403/57
[58] Field of Search ................ 64/17 R, 17 SP, 1 C, 64/7; 403/13, 14, 57

[56] References Cited

U.S. PATENT DOCUMENTS

| 4,124,999 | 11/1978 | Hirasawatsu et al. | 64/17 R |
| 4,195,495 | 4/1980 | Sehlbach et al. | 64/17 R |

FOREIGN PATENT DOCUMENTS

| 52-39048 | 3/1977 | Japan | 64/17 R |
| 1054552 | 1/1967 | United Kingdom | 64/17 R |
| 239721 | 7/1969 | U.S.S.R. | 64/17 R |

Primary Examiner—Ira S. Lazarus
Assistant Examiner—Magdalen Moy
Attorney, Agent, or Firm—Ostrolenk, Faber, Gerb & Soffen

[57] ABSTRACT

This invention concerns an articulated coupling or universal coupling including two coupling halves or forks coupled together. A respective machine part is connectable to each of the coupling halves. A supporting component, such as a bracing rod, extends between the coupling halves. On at least one of the coupling halves is a first surface. A second surface is connected to the rod. A spring, or the like, biases the second surface on the rod against the first surface on the coupling half and such bias blocks the coupling half thus engaged from pivoting, tilting or deflecting. The rod or second surface is so arranged that upon the thus supported coupling half being connected to its respective machine part, the cooperating first and second surfaces are no longer so biased together as to prevent the respective coupling half from pivoting, tilting or deflecting. In some embodiments, an appropriate spring holds the surfaces continuously together, but the spring permits pivoting, tilting or deflecting of the coupling halves when the coupling halves are assembled to their machine parts. In other embodiments, the rod is contacted by the machine part connected to the one coupling half and this actually separates the first and second surfaces which then permits the one coupling half to pivot, tilt or deflect.

15 Claims, 7 Drawing Figures

ARTICULATED COUPLING

BACKGROUND OF THE INVENTION

The invention relates to articulated couplings of the kind having coupling halves which can be pivoted relative to each other and which are used to connect two rotatably mounted machine parts.

Such couplings, usually termed universal joints, are used, for example, for connecting two shafts, and are known, for example, from German Laid-Open Patent Specification Auslegeschrift No. 26 25 960 and corresponding U.S. Pat. No. 4,144,724. The connection between the coupling halves which pivot relative to each other in this kind of articulated coupling can be effected by means of roller components, but preferably, the connection is by means of a crosspiece. The latter coupling is usually termed a "Hooke's joint" or a cross and yoke coupling. The coupling halves are each in the form of a coupling fork.

Articulated couplings of this kind are used in the drives of heavy machines and in other applications. From time to time, very high torques may have to be transmitted, so that articulated couplings of considerable size may be necessary. Their so-called rotation diameter can be up to a meter.

In such cases, difficulties may arise in assembling the articulated couplings with the machine parts to be connected, since at least one of the two coupling halves is tilted downwards, due to its weight, for example. Due to its large weight and mass, the tilted coupling half cannot simply be brought into the position, generally the stretched or central and more upraised position, which is required for assembly of the coupling. This is particularly troublesome when the articulated coupling has to be disconnected and reassembled frequently, to allow bearing rollers in the coupling to be changed, for example.

It has, therefore, already been proposed (in German Registered Utility Application (Gebrauchsmuster) G 77 16 089.5) to provide stops on the coupling halves to restrict their pivot angles. However, this only reduces the aforesaid difficulties. One of the coupling halves still is tilted downwards before being installed on the machine part to be driven, even if only by a lesser amount. This would also be the case if the stops were made yieldable by means of springs, as has already been proposed in other movable couplings.

SUMMARY OF THE INVENTION

An object of the present invention is to provide an articulated coupling of the kind referred to above wherein the coupling halves automatically assume a favorable position for assembly with an adjacent machine part, without significantly restricting the capacity for movement of the coupling halves which is necessary during operation of the machinery.

According to the invention, an articulated coupling of the kind referred to above includes two coupling halves which are connected to each other by a component which extends along the axis of rotation of the coupling and is adapted to yield in the axial direction of the coupling in such a way that the capacity of the coupling halves to pivot or tilt downward is suppressed during the period when the articulated coupling is separated from one of the machine parts to be connected.

Three different basic constructional forms which enable the objects of the invention to be realized are comtemplated within the scope of the invention:

(i) The connecting component may be constructed as a rod, which is rigidly attached to one of the coupling halves and extends along the axis of rotation of the coupling to the other coupling half. In the case of a cross and yoke coupling, the connecting rod extends through the crosspiece. A centering component which can move in the axial direction is arranged on the rod. A biasing force can press that centering component against a surface, preferably conical in shape, on the other coupling half. The latter coupling half can be centered by this means when it is disconnected from the adjoining machine part, whereby the tilting of the coupling half under the force of gravity is counteracted.

Various measures are provided to ensure that the various parts of the articulated coupling remain free to move during normal coupled operation, despite the centering component continuing to act on one of the coupling halves. If the articulated coupling pivots or tilts through any particular deflection angle, then the centering piece carries out a rolling movement on the conical surface of the cooperating coupling half so that friction losses are substantially eliminated.

(ii) With a cross and yoke coupling, a rod can be fixed in the crosspiece to lie approximately parallel to the axis of rotation of the coupling and provide the connecting component. The rod extends through both of the coupling forks, and it has a respective centering piece on each end, which can be displaced against a spring. Each centering piece can be constructed basically in the same way as described in (i) above, or otherwise.

(iii) In a constructional form as already described in (i) or (ii) above, a centering part can be used which is constantly in contact with the relevant coupling fork, or there can be two such centering parts. According to another constructional form, a holding disc can be provided which is also pressed against one of the coupling halves by a biasing force. Yet, this holding disc can be released from the holding surface, against the biasing force, especially during or after assembly of the articulated coupling with the adjacent machine part.

The holding disc can be constructed in such a way that, like the centering part in the constructional forms in (i) or (ii) above, the holding disc effects the centering of the coupling half concerned, i.e. it holds the coupling half securely in the central or untilted position, at a deflection angle of 0°. However, according to an important development, the holding disc can also have a spherical surface concentric with the center point of the coupling as a contact surface, and the associated coupling half then has a holding surface adapted thereto, or vice versa. Alternatively, both parts, the holding disc and the coupling half, can have complementary spherical surfaces. This enables the coupling half to be held stationary at any desired deflection angle when the articulated coupling is dismantled, for example, from a roller journal. This is necessary under certain circumstances for installing the articulated coupling again.

The last described constructional form has the disadvantage that the holding disc must be arranged in the central or inner part of the articulated coupling. Particularly in the case of a cross and yoke coupling, this means that the holding disc is arranged in the area between one of the coupling fork flanges and the crosspiece. However, there is sometimes insufficient available space here, particularly if a large deflection angle is desired for the coupling halves. A further difficulty may arise if the articulated coupling is to have a particularly short over-all length.

A further object of the invention is to develop the last described constructional form in such a way that, despite the presence of the holding disc, it is not necessary to restrict the deflection angle of the coupling half or to increase the over-all length of the coupling.

This object is accomplished by a further embodiment of the articulated coupling. As in the constructional form described in (j) above, the holding disc is now arranged so that it co-acts with the relevant coupling half in an outer end face area of the articulated coupling. This means that in the case of a cross and yoke coupling, the holding disc co-acts with the relevant coupling fork flange in an area facing away from the crosspiece. Thus, the space between the crosspiece and the coupling fork flange is kept substantially clear. There is, therefore, no longer any restriction with regard to the deflection angle of the coupling half, and the over-all length is reduced as far as possible. Further advantages are obtained. The holding disc and the rod used to release it are not mounted in separate coupling halves or coupling forks. Therefore, a spherical support point is not required between these parts. On the contrary, the rod and the holding disc can now be permanently connected together. This simplifies their mounting and the lubrication of these bearing points.

In another construction form, the relevant articulated coupling halves are centered after disconnection of the releasable coupling. This means that the articulated coupling half can always be held stationary in the central position, at 0° deflection angle. In another constructional form, after the releasable coupling has been disconnected, the articulated coupling can remain at the deflection angle it has assumed, and can be held securely in this position.

Other objects and features of the invention will now be described with reference to the accompanying drawings.

DESCRIPTION OF THE PREFERRED EMBODIMENTS

Figure 1:
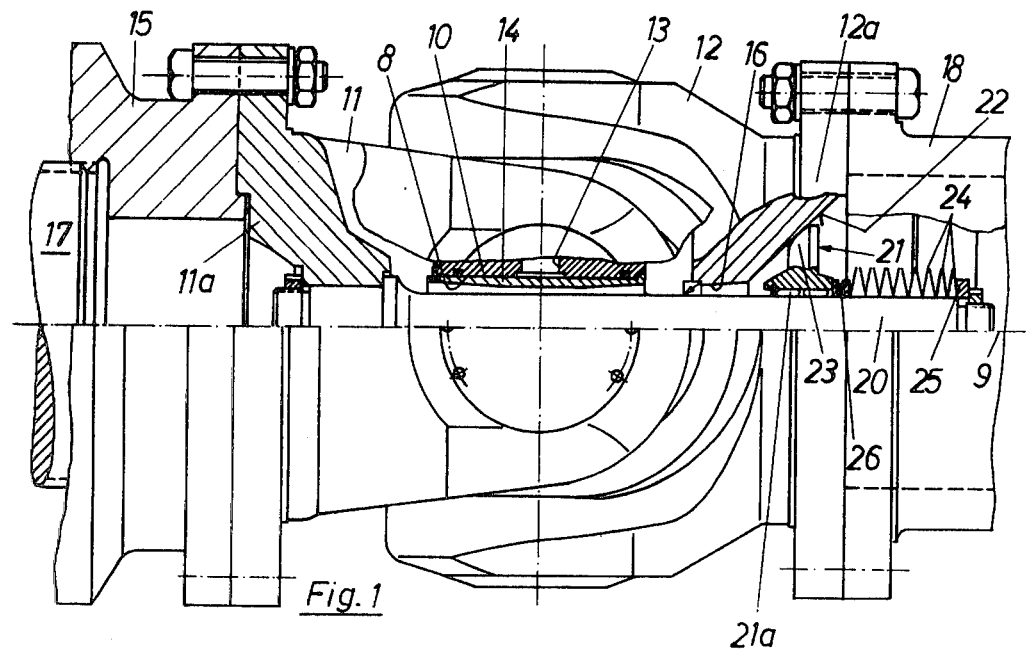
FIG. 1 shows a cross and yoke coupling, partially in longitudinal section and partially in side view, showing one embodiment of the invention.

The cross and yoke coupling of the embodiment shown in FIG. 1 comprises, in the normal way, two coupling forks 11 and 12 which are pivotably mounted on the four pins of a crosspiece 10. In FIG. 1 herein, only a small part of the crosspiece 10, lying near the axis of rotation 9 of the coupling, is visible. The crosspiece here has a bore 8, concentric with the axis of rotation 9. Each of the four pins of the crosspiece 10 has a bore 13. These are all closed off at their bottom ends, in the direction of the axis of rotation 9, by a sleeve 14 that is inserted in the bore 8.

The coupling fork 11 has an outboard flange part 11a thereon. A rod 20 is inserted in the center of the flange part 11a of the coupling fork 11. The rod 20 extends through the inside of the sleeve 14, through a bore 16 disposed concentric with the axis of rotation 9 in the coupling fork 12 and into the inside of a hollow shaft 18 bolted to the coupling fork 12. Thus, the rod 20 extends between the coupling forks 11, 12.

The coupling fork 12 has its own outboard flange part 12a thereon. In the vicinity of the flange part 12a of the coupling fork 12, a disc-shaped centering part 21 is mounted on the rod 20 by means of roller bearings 21a. A conical surface 22 is machined in the coupling fork 12, narrowing from the outside, i.e. from the side facing the hollow shaft 18. The conical surface 22 is inclined at an angle of approximately at least 45° with respect to the axis 9. On its side facing toward the conical surface 22, the centering part 21 has a rounded, but annular, external surface 23 with a cross-sectional shape of a convexly curved arc of a circle. If the surface 23 were extended, it would define a sphere. Therefore, no matter how the centering part 21 deflects, effective surface contact is maintained with surface 23. The surface 23 of the centering part 21 rests on the conical surface 22 of the coupling fork 12.

An extensive pack of dished cup springs 24, e.g. Belleville washers, are also arranged on the rod 20. This spring pack is braced at its outer end on the rod 20 via a fixed thrust washer 25. At its inner end, the spring force of spring 24 is transmitted by means of a thrust roller bearing 26 to the centering part 21 and this presses the centering part 21 against the coupling fork 12.

A so-called wobble compensator 15 is bolted to the coupling fork 11 at the flange part 11a. The compensator 15 has substantially the shape of a hollow shaft. By means of a splined connection therebetween, the wobble compensator 15 can be connected to the drive shaft 17 of a roller or similar machine part so that the compensator is displaceable in the axial direction but it is rotationally fixed to the shaft 17.

When the wobble compensator 15, together with the whole cross and yoke coupling, are released from the shaft 17, the coupling fork 11 and the wobble compensator 15 are held in the stretched or extended position shown with the aid of the centering part 21 and the spring pack 24, against the force of gravity which acts to tilt the wobble compensator 15 and the coupling fork 11 downwardly. In other words, the angle of deflection of the cross and yoke coupling remains approximately 0°. The centering part 21 here lies against a circular line on the conical surface 22 on the coupling fork 12.

When the cross and yoke coupling is connected by means of the wobble compensator 15 to the shaft 17 and when the coupling rotates at any particular or alternating angle of deflection off 0°, the centering part 21 travels slightly outwardly against the biasing force of the spring pack 24. Now the centering part 21 touches the conical surface 22 at only one point. When the cross and yoke coupling rotates in this way, the centering part 21 carries out a to and fro rotating movement on the rod 20, and it rolls over the conical surface 22 on the coupling fork 12.

When spatial conditions allow, the rod 20 can also be fixed in the other coupling fork 12 and not therefore be as shown in FIG. 1, and it then can extend from right to left.

Figure 2:
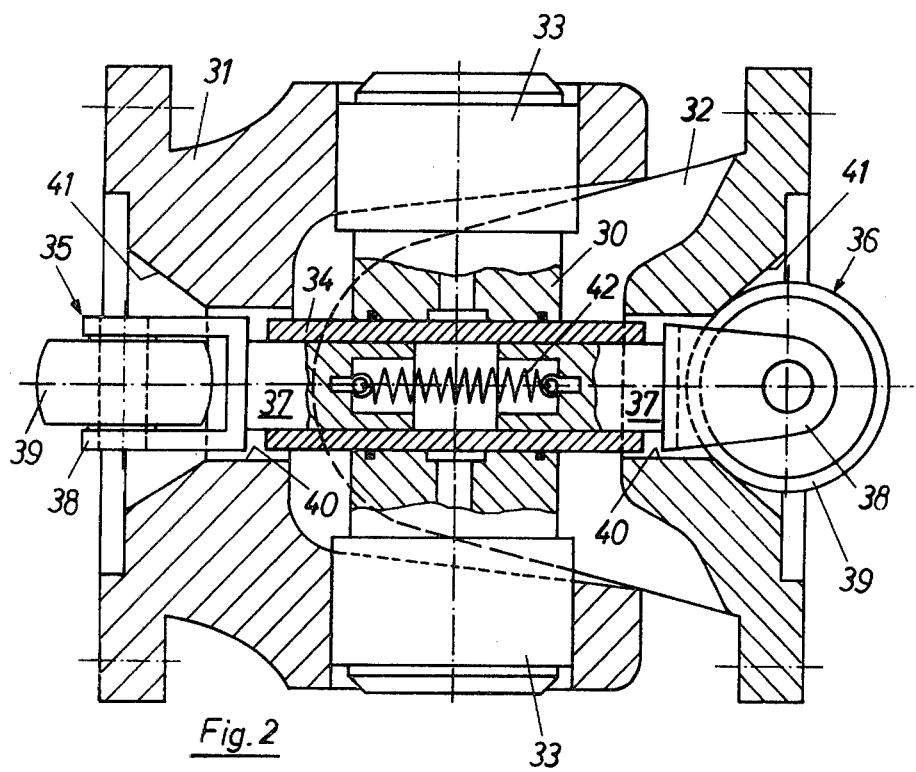
FIG. 2 shows another cross and yoke coupling in longitudinal section showing another embodiment.

The cross and yoke coupling shown in the second embodiment of FIG. 2 includes a crosspiece 30 coupled to two coupling forks 31 and 32. A respective bearing housing 33 mounts each cross pin in its coupling fork. A hollow rod 34, which also may be termed a bracing tube, is arranged in the crosspiece 30 concentrically with the axis of rotation 9. There are two centering parts 35 and 36 which can be displaced in the hollow rod 34 in the axial direction and which can be rotated if required. A pin 37 terminates in a fork end 38 in which a roller 39 with a rounded cross-section, annular external surface is rotatably mounted. The rounded surface of the roller 39 is also curved in cross-section such that it is part of an imaginary sphere. Thus, no matter how the roller 39 deflects with respect to surface 41, continuous effective surface contact is maintained.

The axes of rotation of the two rollers 39 are not approximately parallel to each other, but are instead rotated through 90° to each other. The axis of rotation of each roller lies parallel to the pivot axis of the coupling fork appertaining to it.

Corresponding with the coupling fork 12 shown in FIG. 1, each of the coupling forks 31 and 32 has a central aperture 40 into which the respective centering parts 35 and 36 project and it also has a conical surface 41 machined into it and narrowing from the outside. The two pins 37 are connected together by a tensioned spring 42 inside the tube 34 so that the two rollers 39 are pressed onto their conical surfaces 41. It is apparent that the external surface of each roller 39 acts similarly to and is biased in the same way as the external surface 23 of FIG. 1.

Figure 3:
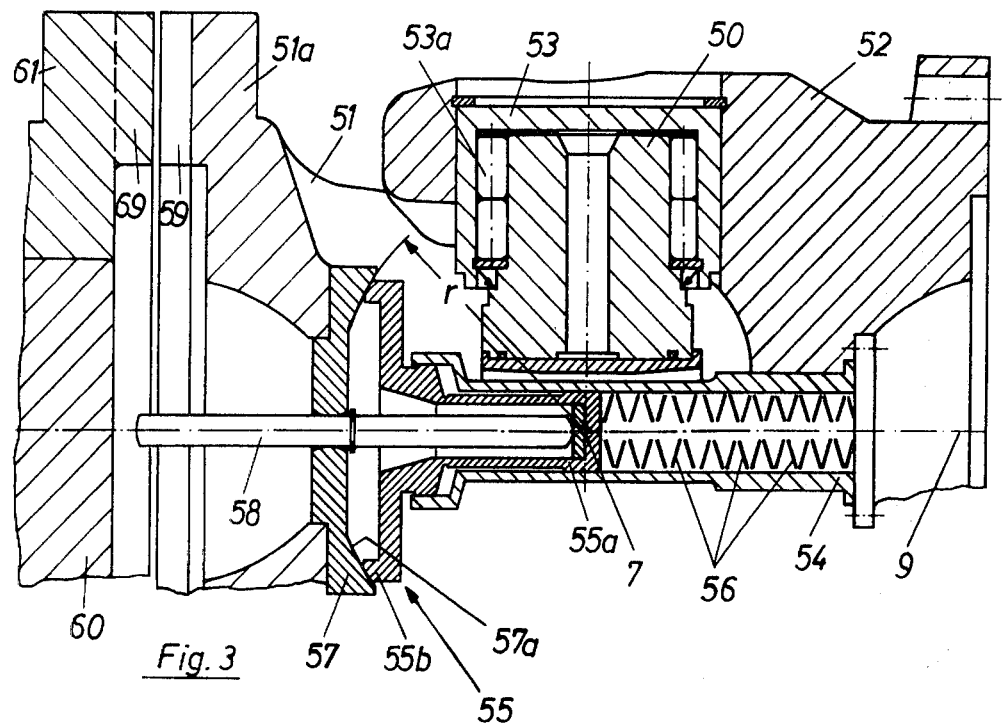
FIGS. 3 and 4 show further forms of the cross and yoke coupling according to further embodiments of the invention, both in longitudinal section.

The cross and yoke coupling of the third embodiment of FIG. 3 includes a crosspiece 50 and coupling forks 51 and 52. There is a bearing housing 53 for roller bearing 53a. See aforesaid U.S. Pat. No. 4,144,724. A hollow rod 54 or bracing tube is fixed centrally in the coupling fork 52. A holding disc 55 is mounted in the rod 54. The disc 55 can be displaced in the axial direction by means of a hollow tubular journal 55a and the disc 55 is pressed against the coupling fork 51 by means of cup shaped springs 56, e.g. Belleville washers, in the tube 54.

In the coupling fork 51, a disc 57 is inserted centrally to the axis of rotation 9. Disc 57 has a spherically, concavely curved surface 57a with radius r, which is concentric with the center point 7 of the crosspiece 50. There is a projecting collar 55b on the periphery of the disc 55. This has a convexly spherically curved surface, which is complementary to the surface 57a.

Due to the complementary spherical shapes of the surface 57a and the counter-surface on the collar 55b on the holding disc 55, the holding disc can hold the coupling fork 51 in any position within the range of possible deflection angles, under the force of the springs 56.

The outer end of a shaft 60, to which a connecting flange 61 is rigidly attached, is also seen in FIG. 3. The connecting flange 61 and the flange 51a of the coupling fork 51 have respective complementary meshable teeth 69 and 59 on their respective end faces for facilitating torque transmission. There is a rod 58 which is concentric with the axis of rotation 9. The rod 58 extends from the terminal region of the shaft 60 through a bore in the disc 57 to the base of the inner chamber of the tubular journal 55a.

In FIG. 3, the cross and yoke coupling is still disconnected from the shaft 60. In this case, there is no contact between the rod 58 and the shaft 60. However, when the teeth 59, 69 in the flanges 51a and 61 are engaged and the flanges are bolted together, the end face of the shaft 60 presses the rod 58 in the direction of the center of the cross coupling, so that the holding disc 55 is moved against the force of the springs 56 and is thereby separated from the disc 57. This means that the parts of the cross and yoke coupling have complete freedom of movement when rotating at any deflection angle, as contrasted with the prior embodiments where there is continuous engagement between the centering part and the adjacent coupling part.

Figure 4:
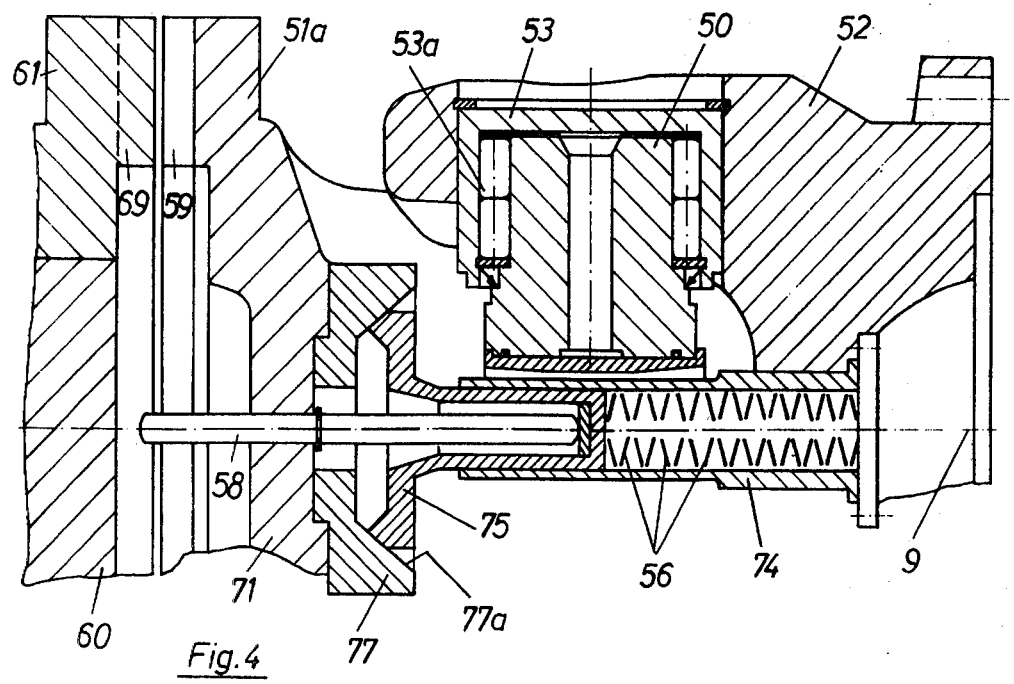

The component parts of the embodiment of FIG. 4, which corresponds with those of FIG. 3, have been designated by the same reference numerals. The embodiment shown in FIG. 4 differs in general from that shown in FIG. 3 only in that the disc 77 attached to the coupling fork 71 has an acute angled conical surface 77a (corresponding to the conical surfaces 22 and 41 in FIGS. 1 and 2) instead of a spherically curved surface. Complementary to this, the holding disc 75, which can be axially displaced in the hollow rod 74 or bracing tube, also has an internal conical surface. In this way, as in the embodiments of FIGS. 1 and 2, centering of the coupling fork 71 is achieved when the cross and yoke coupling is released. Corresponding with FIG. 3, when the cross and yoke coupling is assembled with the shaft 60 which is to be driven, the two discs 75 and 77 are disconnected.

All four of the embodiments of the invention described above have a connecting component that extends along the axis of rotation 9 of the coupling from one coupling fork to the other. The connecting component is in the form of the rod 20 or 34 or 54 or 74, with a centering part 21 or 35/36 or a centering part in the form of a holding disc 55 or 75, which centering parts are axially movable on or along with the respective rod against a spring force. Due to the coaxially arranged spring 24 or 42 or 56, the spring force can be increased at will. In this way, it is possible to hold a very heavy coupling fork securely in the desired position, even when the weight of a wobble compensator 15 (e.g. FIG. 1) is added to it.

The fifth embodiment of a cross and yoke coupling shown in FIG. 5 again comprises two coupling forks 111 and 112, which are pivotably mounted on the four pins of a crosspiece 110. The illustrated pin 113 of the crosspiece 110 is shown extending into a roller bearing housing 114 which is installed in the coupling fork 112. Each other pin 113 extends into a corresponding bearing in its respective coupling fork. The crosspiece 110 has a bore 108 in it concentric with the axis of rotation 109, and the bore 108 tapers concentrically and narrower from either side of the crosspiece toward the center. A bracing tube 120 is inserted in the center of the flange part 111a of the coupling fork 111. This tube extends through the bore 108 of the crosspiece 110. The tube has a stepped or recessed bore 106, 107. The part 107 of the bore with a larger diameter, is located in the vicinity of the coupling fork flange 111a. The part 106 of the bore with a smaller diameter, is located in the vicinity of the crosspiece 110. A bolt or rod 128 is mounted axially movable in the smaller diameter part of the bracing tube 120. The bolt 128 extends through a conical bore 122 which is disposed in the coupling fork 112 and which tapers narrower in the direction of the crosspiece 110. In the flange part 112a, the coupling fork 112 has a central, tapered shape wider recess 116 which is a continuation of the narrower conical bore 122 and meets it at a step 117. In the vicinity of the step 117 a disc-shaped centering part 121, also called a holding disc, is attached to or molded on the bolt 128. The peripheral surface 121a of the centering part is also conically tapered, such that the holding disc 121 fits in the conical bore 122. At its other end, the bolt 128 extends out through the bore 107, and there the bolt carries a disc 127. Inside the bore 107 and around the bolt 128, a compression spring 126 is braced on one side on the disc 127 and on the other side on the step located between the bores 106 and 107. The force of the spring 126 pushes the bolt (as viewed in FIG. 5) toward the left, thus also pulling the holding disc 121 against the conical bore 122 which acts as the holding surface. In this state, the two coupling forks 111 and 112 are centered with each other because the pivoting capacity of the cross and yoke coupling is suppressed.

Figure 5:
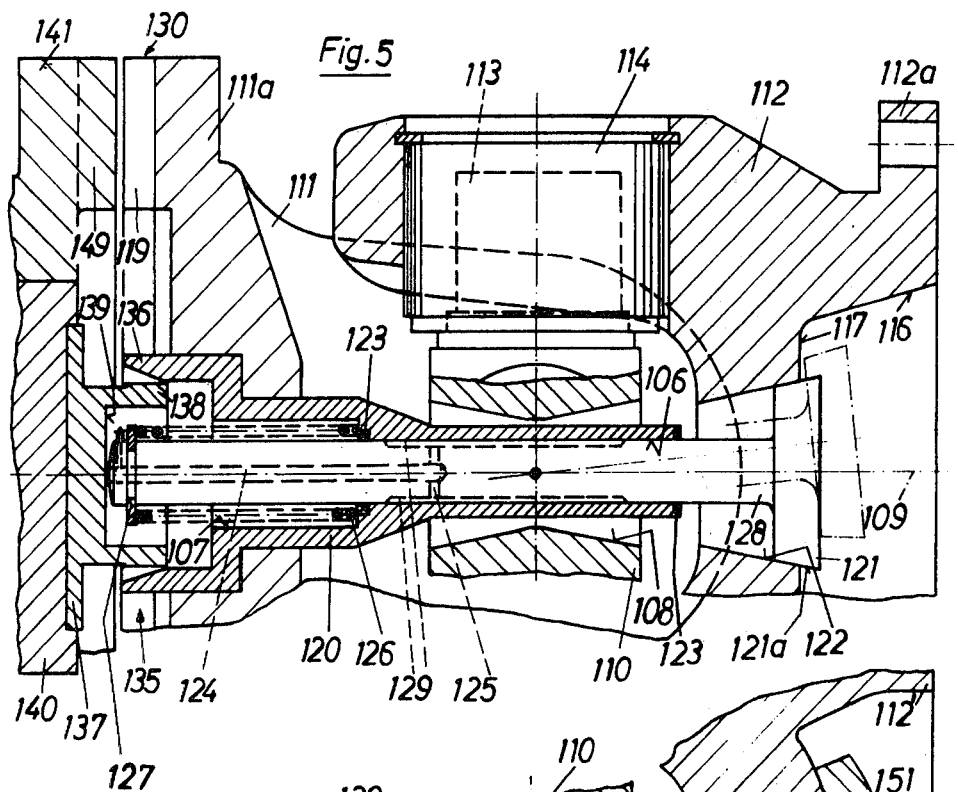
FIG. 5 is a partial longitudinal section through a cross and yoke coupling.

The outer end of a shaft 140, which is to be driven via the cross and yoke coupling and on which a connecting flange 141 is rigidly fixed, can also be seen in FIG. 5. The connecting flange 141 and the coupling fork flange 111a have complementary meshable teeth 149 and 119 on their respective end faces. In this way a quick-release coupling 130 is provided for connecting the cross and yoke coupling to the shaft 140. When the coupling 130 is in the closed position, the flanges 111a and 141 are clamped together, for example by means of bolts (not shown in FIG. 5).

In order to make connection of the releasable coupling 130 easier, a centering device 135 is provided. It comprises a collar 136 formed on the bracing tube 120 and extending in the direction of the coupling 130. In addition, on the shaft 140, a centering hub 137 is attached, having a collar 138 which fits in the collar 136. When the cross and yoke coupling is completely separated from the shaft 140 which is to be driven, the collar 136 also affords a certain amount of protection to the bolt 128 and the spring 126, bearing in mind the rough operation that occurs in rolling mills, for example.

In the position shown in FIG. 5, the cross and yoke coupling is still disconnected from the shaft 140. However, the centering device 135 is already engaged. There is still a slight gap between the end of the bolt 128 and the base 139 of the centering hub 137 attached to the shaft 140. However, when the teeth on the flanges 111a and 141 are engaged, the shaft 140 and the centering hub 137 press the bolt 128 against the force of the spring 126 towards the right (as viewed in FIG. 5), which is in the direction of the center of the cross coupling. The holding disc 121 is thereby released from the holding surface 122 and is pushed into the larger bore 116. The parts of the cross and yoke coupling thereafter have complete freedom of movement when rotating at any angle of deflection. The holding disc 121 may then take up, for instance, the position shown with dashed lines.

Where it is mounted in the bore 106 of the bracing tube 120 the bolt 128 has lubrication grooves 129 which can be filled with lubricating medium via ducts 124, 125. The mounting is protected from the entrance of dirt by means of sealing rings 123.

Figure 6:
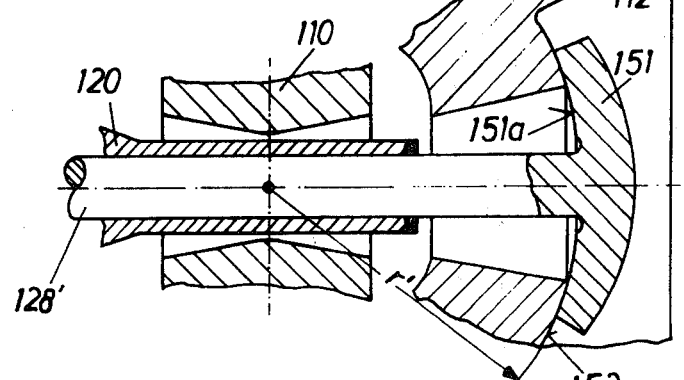
FIG. 6 shows a detail from FIG. 5, with a modified holding disc.

In the sixth embodiment of FIG. 6, instead of the step 117 shown in FIG. 5, the FIG. 6 embodiment includes a spherically convexly curved surface 152 provided on the coupling fork 112', with a radius r' concentric with the center point of the cross and yoke coupling. The surface 152 now forms the holding surface in place of surface 122. Accordingly, the holding disc 151 which is formed on the bolt 128' is provided on its inner end face with a concavely curved, spherical counter surface 151a. This enables the cross and yoke coupling to retain whatever angle of deflection it has assumed, and to be held in this position when the coupling 130 is released. In contrast, in FIG. 5, the cross and yoke coupling is always held at a zero deflection angle by the cooperation between surfaces 121a and 122.

Figure 7:
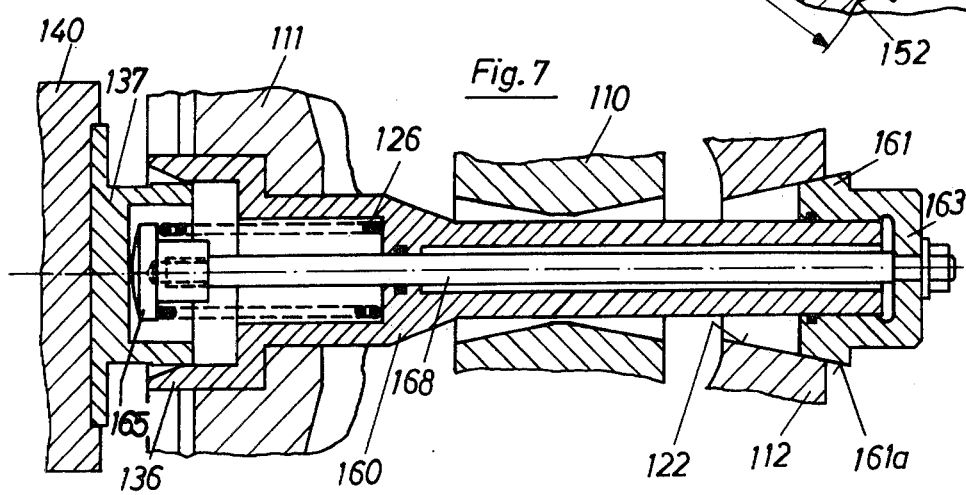
FIG. 7 is a partial longitudinal section through a further constructional form of the cross and yoke coupling according to the invention.

FIG. 7 shows a seventh embodiment which is another modification of the cross and yoke coupling shown in FIG. 5. In FIG. 7, where the relevant parts are the same as in FIG. 5, the same reference numerals are used. In FIG. 5, the bolt 128 carries the holding disc 121 and is therefore subjected to a bending moment by the weight of the coupling fork 111 when the coupling 130 is released. In FIG. 7, provision is made for the holding disc 161 to be mounted directly on the bracing tube 160 which replaces the tube 120. The bolt or rod 168 can therefore be made less rigid or strong. Space is thereby gained to make the bracing tube 160 stronger, that is, to provide it with a greater wall thickness. However, the bracing tube 160 must also be longer than the tube 120 of FIG. 5. The tube 160 must extend through the bore 122 in the coupling fork 112. The holding disc 161 is now a pot-shaped structure which is screwed onto the bolt 168 at its base 163 and which includes a collar with a conical external surface that cooperates with the internal surface of bore 122.

At its opposite end, the bolt 168 carries a resilient cap 165, which co-acts via its end face with the centering hub 137 attached to the shaft 140 in the same way as the end of the bolt 128 acts in the embodiment of FIG. 5.

As in the modification of FIG. 6, in the embodiment shown in FIG. 7, the holding surface and the holding disc counter-surface which is complementary thereto can also be spherical surfaces that are disposed concentric with the center point of the cross and yoke coupling.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. An articulated coupling which is used to connect two rotatable machine parts, or the like, said coupling comprising;

two coupling halves coupled together and each being connectable with a respective machine part; at least one of said coupling halves being able to pivot, tilt or deflect from its orientation at which it may be connected to its respective machine part;

said coupling having an axis of rotation about which said coupling rotates along with the machine parts to which said coupling is connected;

a component passing between both said coupling halves and extending generally along said coupling axis for engaging said one coupling half for blocking said one coupling half from pivoting, tilting or deflecting; said component being yieldable in the axial direction of said coupling for selectively engaging said one coupling half upon said one coupling half being separate from the respective machine part for preventing pivoting, tilting or deflecting, and for selectively permitting said one coupling half to pivot, tilt or deflect upon said one coupling half being connected to the respective machine part;

said component comprising:

an axially displaceable rod, supported by said one coupling half and being axially shiftable with respect to both of said one and the second said coupling half; said rod extending beyond said one coupling half in a manner such that when said one coupling half is connected to the respective machine part, said rod is shifted axially toward said second coupling half;

biasing means for biasing said rod toward the respective machine part for said one coupling half;

a cooperating surface on said second coupling half and facing for engaging a holding disc on said rod;

a holding disc connected to said rod for being biased, by the biasing of said rod, into engagement with said cooperating surface for thereupon preventing pivoting, tilting or deflecting of said rod, thereby to block pivoting, tilting or deflecting of said one coupling half.

2. The articulated coupling of claim 1, further comprising a releasable connection for connecting said one coupling half to the respective machine part.

3. The articulated coupling of claim 1, further comprising a taperingly shaped hole in said second coupling half, said hole having side walls that taper narrower in the direction toward said one coupling half and that define said cooperating surface;

said holding disc including an annular surface thereon adapted to engage said cooperating surface when said biasing means urges said rod to shift and while said one coupling half is not connected to the respective machine part.

4. The articulated coupling of claim 1, wherein said cooperating surface is a convexly curved surface, which is spherically shaped and concentric about the center point of said coupling;

said holding disc having a surface for engaging said cooperating surface upon said biasing means urging said rod to shift while said one coupling half is not connected to the respective machine part, and said holding disc surface being concavely spherically curved around the center point of said coupling.

5. The articulated coupling of claim 1, wherein said component further comprises a stationary bracing tube fixed to said one coupling half and through which said rod extends.

6. The articulated coupling of claim 5, wherein said rod is axially movable with respect to said bracing tube.

7. The articulated coupling of claim 6, wherein said biasing means comprises a spring near said one coupling half and connected between said rod and said bracing tube.

8. The articulated coupling of claim 6, further comprising a taperingly shaped hole in said second coupling half and said hole having side walls that taper narrower in the direction toward said one coupling half and that define said cooperating surface;

said holding disc including an annular surface thereon adapted to engage said cooperating surface when said biasing means urges said rod to shift and while said one coupling half is not connected to the respective machine part.

9. The articulated coupling of claim 8, wherein said hole has a depth such that when said rod is shifted against the bias of said biasing means upon said one coupling half and the respective machine part being connected, said holding disc is shifted completely free of said hole, which frees said holding disc for tilting beyond the confines of said side walls of said hole.

10. The articulated coupling of claim 6, wherein said cooperating surface is a convexly curved surface, which is spherically shaped and concentric about the center point of said coupling;

said holding disc having a surface for engaging said cooperating surface upon said biasing means urging said rod to shift while said one coupling half is not connected to the respective machine part, and said holding disc surface being concavely spherically curved around the center point of said coupling.

11. The articulated coupling of claim 5, further comprising a first centering device on said bracing tube at the end thereof facing toward the respective machine part of said one coupling half; a cooperating second centering device for being supported by that respective machine part; said first and said second centering devices being engageable under the bias of said biasing means for centering said bracing tube when said one coupling half is connected to the respective machine part.

12. The articulated coupling of claim 11, wherein said first centering device comprises a collar on said tube and said second centering device comprises means for engaging and centering said collar.

13. The articulated coupling of claim 5, wherein said rod and said bracing tube are attached to axially shift together.

14. The articulated coupling of claim 13, wherein said holding disc is secured to said tube.

15. The articulated coupling of claim 13, further comprising a taperingly shaped hole in said second coupling half and said hole having side walls that taper narrower in the direction toward said one coupling half and that define said cooperating surface;

said holding disc including an annular surface thereon adapted to engage said cooperating surface when said biasing means urges said rod to shift and while said one coupling half is not connected to the respective machine part.

* * * * *